(12) United States Patent
Banerjee et al.

(10) Patent No.: US 9,095,839 B2
(45) Date of Patent: Aug. 4, 2015

(54) CONFINEMENT OF NANOSIZED METAL ORGANIC FRAMEWORK IN NANO CARBON MORPHOLOGIES

(71) Applicant: COUNCIL OF SCIENTIFIC AND INDUSTRIAL RESEARCH, New Delhi (IN)

(72) Inventors: Rahul Banerjee, Pune (IN); Sreekumar Kurungot, Pune (IN); Pradip Shashikant Pachfule, Pune (IN); Beena Kalasaparambil Balan, Pune (IN)

(73) Assignee: Council of Scientific and Industrial Research, New Delhi (IN)

( * ) Notice: Subject to any disclaimer, the term of this patent is extended or adjusted under 35 U.S.C. 154(b) by 26 days.

(21) Appl. No.: 13/707,880

(22) Filed: Dec. 7, 2012

(65) Prior Publication Data

US 2013/0157837 A1 Jun. 20, 2013

(30) Foreign Application Priority Data

Dec. 15, 2011 (IN) .......................... 3658/DEL/2011

(51) Int. Cl.
| | | |
|---|---|---|
| B01J 33/00 | (2006.01) | |
| B01J 37/34 | (2006.01) | |
| B01J 20/00 | (2006.01) | |
| B01J 23/02 | (2006.01) | |
| B01J 20/22 | (2006.01) | |
| B01J 20/20 | (2006.01) | |
| C01B 3/00 | (2006.01) | |
| B01D 53/02 | (2006.01) | |
| B82Y 40/00 | (2011.01) | |
| B82Y 30/00 | (2011.01) | |

(52) U.S. Cl.
CPC .............. *B01J 20/226* (2013.01); *B01D 53/02* (2013.01); *B01J 20/205* (2013.01); *C01B 3/0015* (2013.01); *B01D 2253/204* (2013.01); *B01D 2257/504* (2013.01); *B01J 2220/46* (2013.01); *B82Y 30/00* (2013.01); *B82Y 40/00* (2013.01); *Y02C 10/08* (2013.01); *Y02E 60/328* (2013.01); *Y10S 977/779* (2013.01); *Y10S 977/892* (2013.01)

(58) Field of Classification Search
USPC .......................................... 502/5, 1, 400, 439
See application file for complete search history.

(56) References Cited

PUBLICATIONS

Petit et al. Adv. Mater. 2009, 21, 4753-4757.*
Yang et al. Chem. Mater. 2009, 21, 1893-1897.*

* cited by examiner

*Primary Examiner* — James McDonough
(74) *Attorney, Agent, or Firm* — Ladas & Parry LLP

(57) ABSTRACT

A hybrid composite of Metal Organic Frameworks (MOF) encapsulated in nanocarbon material, wherein the MOFs are grown inside or outside or both side of nano carbon morphologies of the hybrid composite. Such composites may be prepared by a. dissolving and mixing a salt of the metal and a ligand in the ratio ranging between 1:1 to 1:4 (by w/w ratio) by sonicating them to form a precursor mixture;
b. adding non-functionalized or functionalized nano-carbon material to the precursor mixture of step (a);
c. sonicating the mixture of step (b) followed by heating;
d. keeping the slurry obtained at elevated temperature followed by centrifugation.

13 Claims, 7 Drawing Sheets
(3 of 7 Drawing Sheet(s) Filed in Color)

CONFINEMENT OF NANOSIZED METAL ORGANIC FRAMEWORK IN NANO CARBON MORPHOLOGIES

The following specification particularly describes the invention and the manner in which it is to be performed:

FIELD OF THE INVENTION

The present invention discloses a hybrid material of Metal Organic Framework (MOF) encapsulated in nano carbon morphologies. More particularly the invention discloses the confinement of MOFs inside, outside and also inside and outside of nano carbon morphologies with improved thermal and chemical properties. Further the invention also discloses a process to prepare such MOF encapsulated in single dimension nano carbon materials.

BACKGROUND AND PRIOR ART OF THE INVENTION

Research on MOF as well as carbon nano morphologies like carbon nanotubes (CNTs), graphene (GE) and carbon nanofibers (CNFs) has picked up attention due to variety of applications like gas storage, sensing, drug delivery and catalysis.

The large void space generated by cages in MOFs is not completely utilized for hydrogen or other gas storage applications owing to weak interactions between the walls of MOFs and $H_2$ molecules. These unutilized volumes in MOFs can be effectively utilized by incorporation of other microporous materials such as single walled carbon nanotubes into the pores of MOFs which could effectively tune the pore size and pore volume of the material towards hydrogen sorption. Also, efforts are on to improve the properties of both MOFs as well as nano carbon morphologies. Specific examples of projects undertaken in MOFs aim at increasing and controlling functionality, introduction of exposed metal sites, doping the MOFs with alkali metal ions and such others. Similarly, for nano carbon morphologies, various strategies like surfactant encapsulation, polymer wrapping and attachment of various metal and metal oxide nanoparticles have been attempted.

References may be made to Patent EP1513612, which discloses a porous metal-organic framework, which can be used to store gases, such as hydrogen. The invention further provides a metal-organic framework comprising organic functional groups directed into the one or more cavities that are capable of reacting with a storage gas. It further provides method by which a novel group of MOFs is prepared by inverting the structural role of the Secondary Building Unit (SBU) and linear organic bridge such that the SBU serve as a linear bridge and the organic ligand serves as a node.

References may be made to Journal. Angewandte Chemie International Edition Volume 50, Issue 2, pages 491-494, Jan. 10, 2011, wherein Zhonghua Xia et. al have reported that the gas storage capacities of metal-organic frameworks can be increased by incorporation of carbon nanotubes and doping of the resulting framework with lithium ions. The combination they have suggested cause improvement of the $CO_2$ and $CH_4$ uptakes by about 305% and 200% respectively.

References may be made to Journal International Journal of Hydrogen Energy, Volume 36, Issue 13, July 2011, Pages 7594-7601, wherein K. P. Prasanth et. al. have reported synthesis of Single walled carbon nanotubes (SWNT) and MOF composite by adding purified SWNT in situ during the synthesis of composite. Hydrogen sorption capacities of MIL-101 was observed to increase from 6.37 to 9.18 wt % at 77 K up to 60 bar and from 0.23 to 0.64 wt % at 298 K up to 60 bar. The increment in the hydrogen uptake capacities of composite MOF materials was attributed to the decrease in the pore size and enhancement of micropore volume of MIL-101 by single walled carbon nanotube incorporation.

Despite the recent progresses in the construction of novel MOF-nano carbon hybrid structures through different strategies and improvement in the sorption capabilities of such hybrids, the nature of interaction between the MOF and nanocarbon components still possesses a limitation to the versatile exploration of such hybrids. Also, most of the hybrids are physical mixtures and they lack proper chemical interactions between the individual counterparts.

To achieve the desired properties and synergies of the hybrid composite of MOFs and carbon nano morphologies, mere physical mixing is not the desired process of making them. But, the modifications in the properties by synergistic effects need chemical interactions such that they result in novel hybrids of MOFs and nano carbon morphologies with modulated properties with synergistic effects.

To overcome the disadvantages of the prior art and to provide solution to the long standing problems, the inventors have come up with novel hybrids of MOFs and nano carbon morphologies.

OBJECTS OF THE INVENTION

Main objective of the present invention is to provide hybrid material of Metal Organic Framework (MOF) encapsulated in nano carbon morphologies.

Another objective of the present invention is to disclose the confinement of MOFs inside, outside and also inside and outside of nano carbon morphologies with improved thermal and chemical properties.

Another object of the present invention is to provide a process of preparation of novel hybrids of MOFs and nano carbon morphologies.

SUMMARY OF THE INVENTION

Accordingly, present invention provides a hybrid composite of Metal Organic Frameworks (MOF) encapsulated in nanocarbon material, wherein the MOFs are grown inside or outside or both side of nano carbon morphologies of the hybrid composite.

In an embodiment of the present invention, deposition of MOF in nanocarbon material is preferably one dimensional.

In yet another embodiment of the present invention, the nanocarbon material includes carbon nanotubes, carbon nano fibers, graphene, carbon nano ribbons.

In yet another embodiment of the present invention, the nanocarbon tubes are selected from the group consisting of single-walled nanocarbon tubes, double walled nanocarbon tubes or multi walled nanocarbon tubes.

In yet another embodiment of the present invention, the encapsulated MOF in nanocarbon material is preferably of size 20-30 nm.

In yet another embodiment of the present invention, said hybrid composite is thermodynamically stable for temperature ranging between 25 to 300° C.

In yet another embodiment of the present invention, said encapsulated MOF hybrid material is useful for gas uptake, gas separation, and $CO_2$ sequestration.

In yet another embodiment of the present invention, said composite enhanced gas uptake to the order of ~30% in the $H_2$ uptake and ~25% increase of $CO_2$ uptake.

In yet another embodiment, present invention provides a process to produce hybrid MOF encapsulated in nanocarbon material as claimed in claim 1 and the said process comprising the steps of;
   i. dissolving and mixing a salt of the metal and a ligand in the ratio ranging between 1:1 to 1:4 (by w/w ratio) by sonicating them to form a precursor mixture;
   ii. adding 10 to 40% pristine (non-functionalized) or functionalized nano-carbon material to the precursor mixture of step (a);
   iii. sonicating the mixture of step (b) followed by heating the mixture at temperature in the range of 80-100 deg C. for period in the range of 24-72 hours depending on the time for MOF growth to obtain MOF slurry;
   iv. keeping the slurry as obtained in step (c) at a temperature in the range of 80-120° C. for period in the range of 24-48 hours followed by centrifugation at 500 to 2000 rpm to obtain MOF encapsulated in nanocarbon material.

In yet another embodiment of the present invention, the metal is selected from the group consisting of alkali metals, alkaline earth metals, transition metals, post-transition metals, lanthanides or actinides.

In yet another embodiment of the present invention, the organic ligands are selected from the group consisting of organic linkers like carboxylic acids, imidazolates, triazolates, tetrazolates, phosphates and its substituted linkers.

In yet another embodiment of the present invention, the nanomaterial is optionally activated by an $H_2O_2$ treatment at a temperature range of 50-100° C. for period in the range of 3 to 6 hours to introduce functional groups prior to reacting with precursor mixture, to introduce uniform loading.

In yet another embodiment of the present invention, the preferable temperature for activation is 60° C.

In yet another embodiment of the present invention, the preferable temperature for sonication in step (c) is 90° C.

In accordance with the above, the invention discloses novel hybrid composites of MOFs encapsulated in nano carbon morphologies, where the MOFs are grown inside, outside and both inside and outside of the nano carbon morphologies in nano size.

In another aspect, the invention discloses MOFs@Pristine Carbon Nano Fibers (PCNFs) and loaded MOF on Functional group on PCNF also called MOFs@FCNFs and process for preparation thereof.

In yet another aspect, the invention discloses the characterization of the hybrids prepared according to the invention for their modulated thermal and chemical properties. In a further aspect, the invention discloses an in-situ process for preparation of said hybrids.

BRIEF DESCRIPTION OF THE DRAWINGS

The file of this patent contains at least one drawing or photograph executed in color. Copies of this patent with color drawing(s) or photograph(s) will be provided by the Patent and Trademark Office upon request and payment of necessary fee.

DETAILED DESCRIPTION OF THE INVENTION

Figure 1:
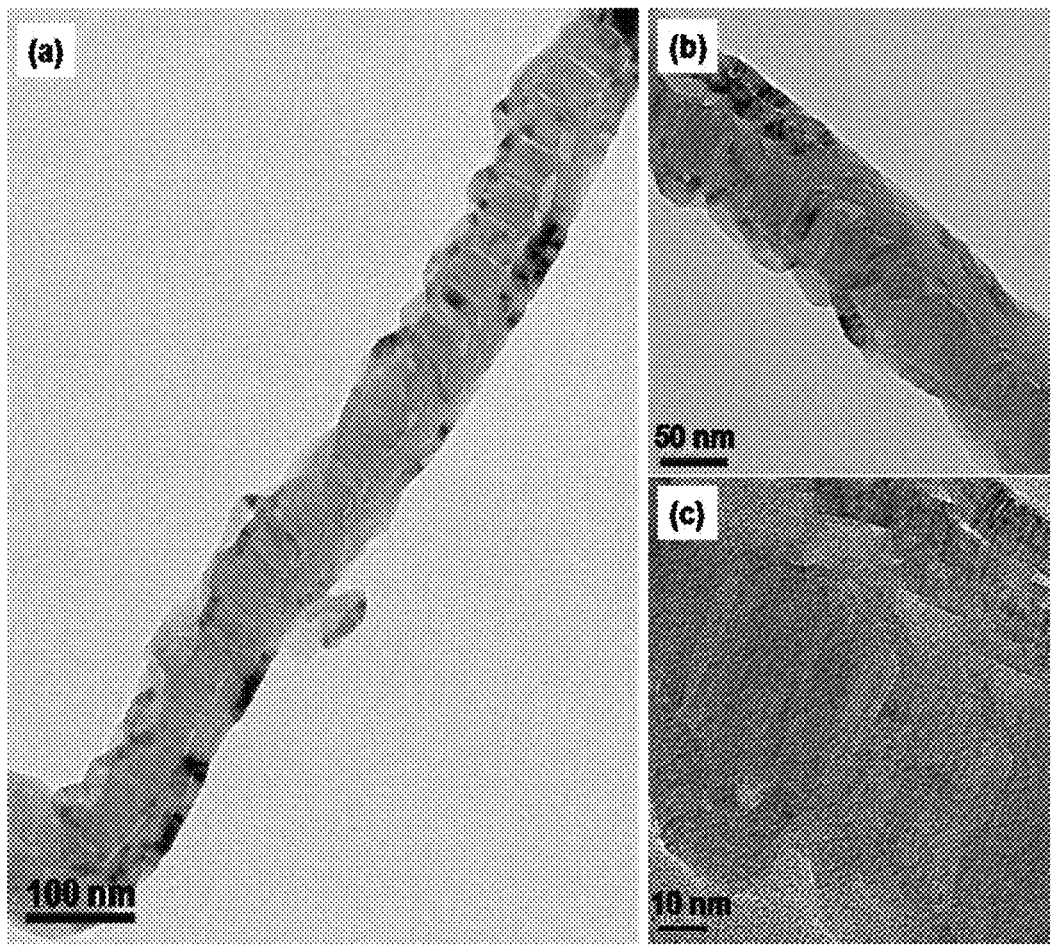
FIGS. 1: (a) and (b) HRTEM images of MOF@PCNF at different magnifications clearly show the one-dimensional confinement of nanosized MOFs in the inner cavity of CNFs. (c) Image showing the continuous lattice fringes indicating clearly the crystalline nature of the MOFs.

As used herein the words 'encapsulated' and/or 'confinement' means and includes the presence of the MOFs grown inside, outside and also inside and outside of nano carbon morphologies of the hybrid composite of the invention.

To achieve the objectives of the invention, the inventors disclose herein novel hybrid composites of MOFs and nano carbon morphologies. The MOFs of the invention comprises metal selected from Alkali metals, Alkaline earth metals, Transition metals, Post-transition metals, Lanthanides and Actinides while ligands are selected from organic linkers like carboxylic acids, imidazolates, triazolates, tetrazolates, phosphates and its substituted linkers.

The nano carbon morphologies of the invention comprises high aspect ratio carbon morphologies selected from carbon nanotubes, carbon nano fibers, graphene, carbon nano ribbons and such like. The carbon nanotubes are selected from single-walled, double walled or multi walled nanotubes. Nano MOFs in the hybrid are confined outside the nano carbon morphologies. Nano MOFs in the hybrid are confined inside the nano carbon morphologies. Nano MOFs in the hybrid are confined both inside and outside the nano carbon morphologies.

The novel hybrid composites of MOFs and nano carbon morphologies are prepared by a novel process comprising in-situ MOF growth on the carbon nano-morphologies. The detailed steps of the process comprise:
   a. Dissolving and mixing a salt of the metal and a ligand by sonicating them to form a precursor mixture,
   b. Adding Pristine (non-functionalized) or functionalized nano-carbon material to the precursor mixture of step (a); and
   c. Sonicating the mixture of step (b) and heating the mixture at 80-100 deg C. for upto 24-72 hours depending on the time for MOF growth to obtain MOF encapsulated in nanocarbon material.
   d. The slurry obtained from step (c) was then kept at a temperature range of 80-120° C. for 24-48 hours for the complete formation of MOF crystals. However the preferred temperature for the step was 90° C.

For uniform loading of MOFs on the outer walls as well as in the inner cavity of CNFs, PCNF were first activated by an $H_2O_2$ treatment at a temperature range of 50-100° C. for 6 hours to introduce functional groups on PCNFs (FCNF). The results obtained were optimal at 60° C.

The hybrid material so obtained was purified and separated from the unattached MOFs by centrifugation at 2000 rpm in the same solvent used for the synthesis. This process was repeated 5 times in order to purify MOF@CNF hybrid from the MOF crystals. Pure MOF crystals settled down at the bottom and were separated from the hybrid material.

The solvents used in the process above include N,N-diethyl formamide, N,N-dimethyl formamide, water, Ethylene glycol-water mixture, alcohols like methanol, ethanol, isopropanol, etc.

TEM, XPS analysis, variable temperature PXRD (VT-PXRD) and Thermogravimetric Analysis (TGA) were performed with the product to confirm the content and the phase purity of samples.

TEM imaging shows that the FCNF host is homogeneously loaded with the MOF crystals on the outer wall along with their stacking in the inner cavity. Further high magnification images indicate the highly crystalline nature of these particles.

The size of the MOF crystals on the outer wall is slightly larger, ca. 50-60 nm, as compared to those in the inner cavity. This can be attributed to the more freedom for growth on the outer surface compared to the restricted inner cavity of CNF.

The intimate interaction between the FCNFs and the MOF is unraveled using XPS analysis as shown in FIGS. 4(a) & (b).

The hybrid material thus prepared is characterized by HRTEM to confirm confinement of MOFs in nano size, inside, outside and inside and outside pristine CNF. The MOF crystals formed as per the invention are strictly in nanoregime with size ca. 20-30 nm, which correlates closely with the inner diameter of the CNFs The porosity and gas porosity analysis of the product shows that there is a significant increase of absorption ~30% in the $H_2$ uptake and ~25% increase of $CO_2$ uptake.

The TGA analysis shows that the thermostability of the product is increased at least by ≥100 degree C.

The material thus produced finds use in gas adsorption, separation, electrode and material substrate applications. The material possesses modulated properties when compared to pristine nano carbon morphology or MOF.

EXAMPLES

Following examples are given by way of illustration and therefore should not be construed to limit the scope of the invention.

Materials and Methods 1,4-Benzene dicarboxylic acid (Terephthalic acid), N,N-Diethylformamide (DEF) and $Zn(NO_3)_2.6H_2O$ were purchased from Aldrich Chemicals. All starting materials were used without further purification. All experimental operations were performed in air and all the stock solutions were prepared in DEF.

Example 1

Preparation of Zinc Terephthalic Acid Based MOF@PCNF

MOF@PCNF were synthesized by solvothermal reaction between $Zn(NO_3)_2.6H_2O$ (0.1 gm) and terephthalic acid (1,4-benzene dicarboxylic acid) (0.4 gm) in 10 ml N,N-Diethylformamide (DEF). The aforementioned amounts of the precursors, $Zn(NO_3)_2.6H_2O$ and terephthalic acid were dissolved in N,N-Diethylformamide and mixed by ultra-sonication (5 min) to get a uniform mixture to which a weighed amount (45 mg) of the pristine CNF (PCNF) was added. This was subjected to extensive sonication using a probe type sonicator (10 sec pulse for 5 times). This slurry was then kept at 90° C. for 48 hours for the complete formation of MOF crystals. To achieve the uniform loading of MOFs on the outer walls as well as in the inner cavity of CNFs, PCNF were first activated by an $H_2O_2$ treatment at 60° C. for 6 hours to introduce functional groups on PCNFs (FCNF) and the aforementioned synthetic approach was performed to load MOF on FCNF (MOF@FCNF).

Characterization of MOF@PCNF

HRTEM studies of the material of example 1 confirmed the confinement of nano MOFs inside, outside and inside as well as outside the PCNFs. The HRTEM image of MOF@PCNF, shown in FIG. 1, clearly shows the one-dimensional stacking of MOF crystals in the entire length of the inner cavity of the CNFs. The high magnification image of the same given in FIG. 1 indubitably confirms that regular hexagonal shaped MOF crystals are stacked together in an organized way.

Figure 2:
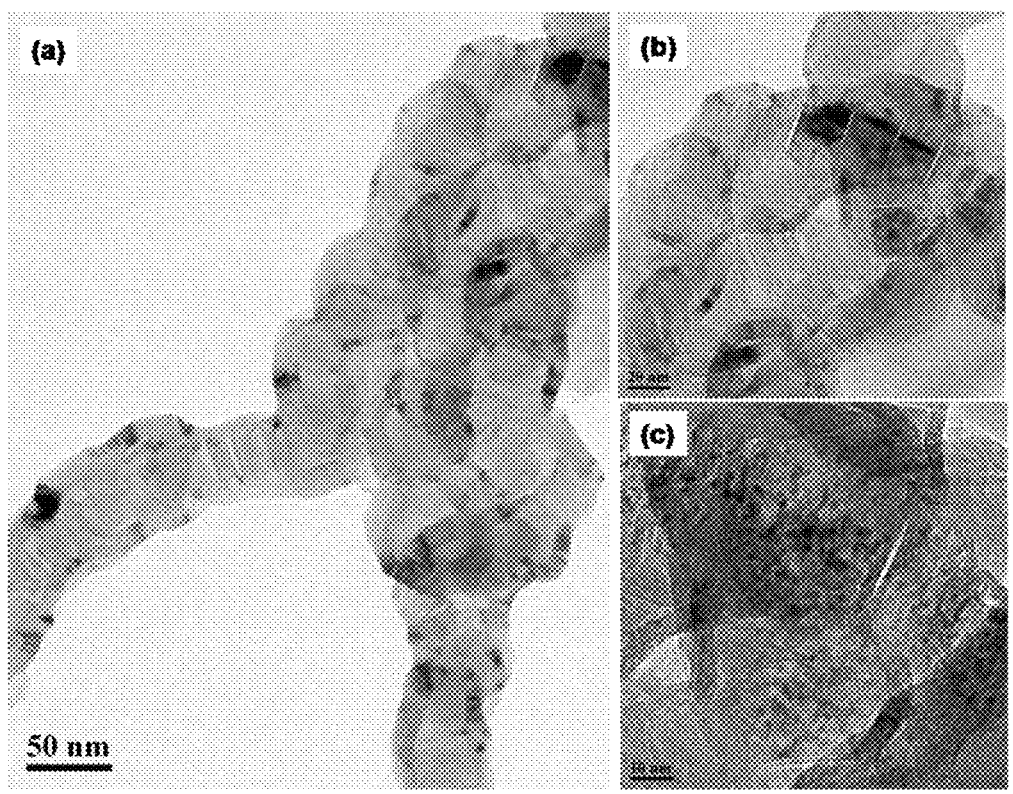
FIGS. 2: (a) and (b) HRTEM images of MOF@FCNF at different magnifications are depicting the attachment of MOFs on the outer walls along with its confinement in the inner cavity. (c) Image showing the continuous lattice fringes clearly indicating the crystalline nature of the MOFs both in the inner cavity as well as on the outer walls.

MOF@FCNF is also explored using TEM imaging which clearly illustrate that the FCNF host is homogeneously loaded with the MOF crystals on the outer wall along with their stacking in the inner cavity as shown in FIG. 2a. The high magnification image given in FIG. 2(b) indicates the highly crystalline nature of these particles. The size of the MOF crystals on the outer wall is slightly larger, ca. 55 nm, as compared to those in the inner cavity. This can be attributed to the more freedom for growth on the outer surface compared to the restricted inner cavity of CNF. The distortion of the wall of CNF as evident from FIG. 2(c) clearly demonstrates the stress induced during the restricted growth of MOF along the inner cavity of CNF.

Gas Adsorption Studies

Figure 3:
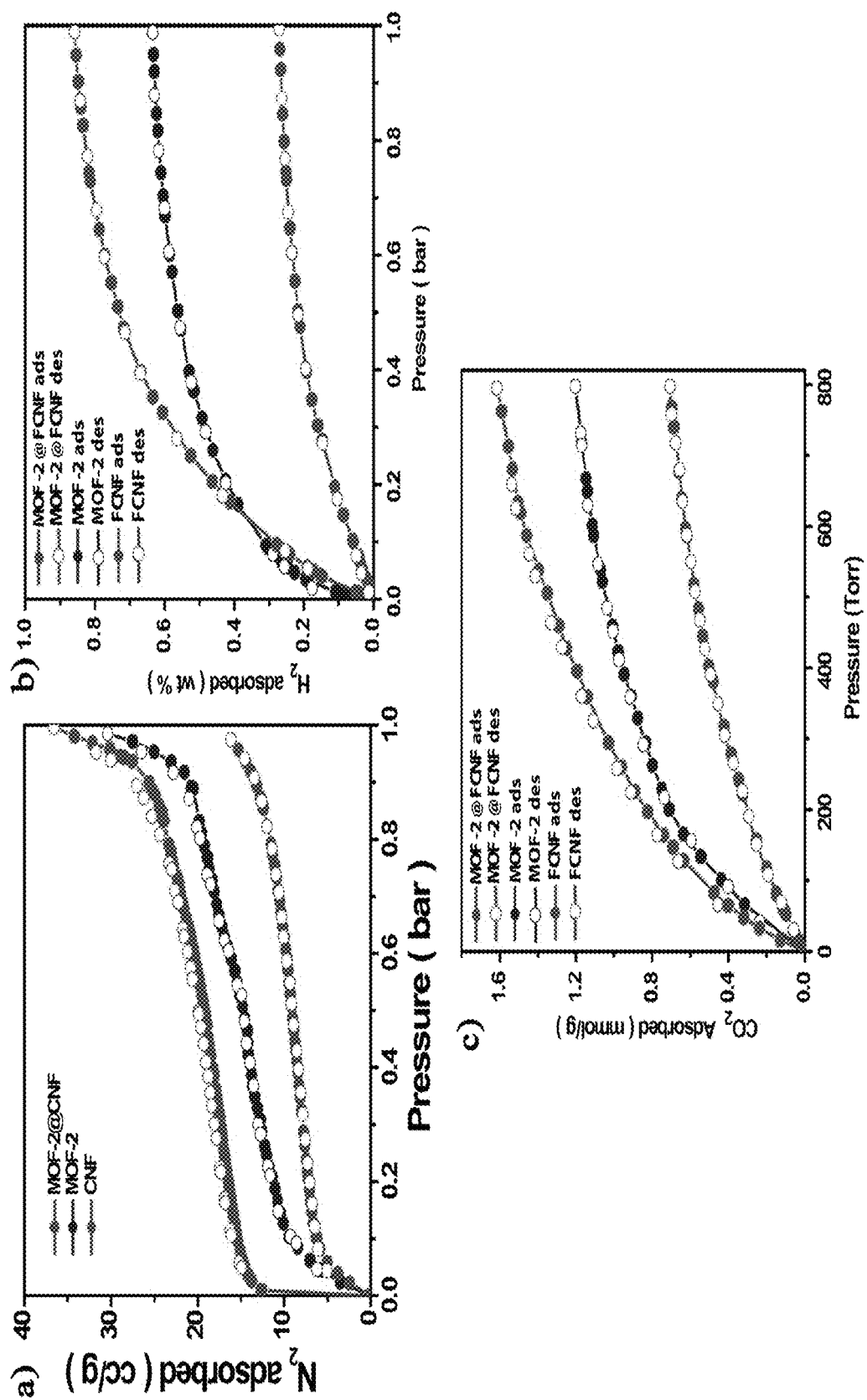
FIG. 3: (a) Typical Type-I nitrogen adsorption isotherms for Zn-terephthalate based MOF (MOF-2)@FCNF, MOF-2 and FCNF at 77 K and 1 atm pressure. (b) Typical Type-I hydrogen adsorption isotherms for MOF-2@FCNF, MOF-2 and FCNF at 77 K and 1 atm pressure. (c) Typical Type-I $CO_2$ adsorption isotherms for MOF-2@FCNF, MOF-2 and FCNF at 298 K and 1 atm pressure.

The permanent porosity of the activated samples of FCNF, (Zn-terephthalate based MOF) MOF-2 and MOF@FCNFs is confirmed by $N_2$ adsorption study. The $N_2$ adsorption isotherms for the activated samples of FCNF, MOF-2 and MOF@FCNF exhibit type-I sorption behaviour (FIG. 3a) with Langmuir surface areas of 37, 68 and 81 $m^2$/g and BET surface areas of 23, 39 and 50 $m^2$/g respectively. Further, all these samples show reversible type-I $H_2$ and $CO_2$ adsorption isotherms at 77 and 298 K, respectively at 1 atm pressure indicating reversible adsorption (FIGS. 3b and 3c). At 1 atm pressure and 77 K, FCNF and MOF-2 adsorb 0.27 and 0.63 wt % $H_2$, while MOF@FCNF adsorbs 0.84 wt % $H_2$. In case of $CO_2$ adsorption, at 298 K, FCNF and MOF-2 adsorb 0.70 and 1.20 mmol/g $CO_2$ as the pressure approaches to 1 atm, while MOF@FCNF adsorbs 1.61 mmol/g $CO_2$ at 298 K and 1 atm pressure. So, there is a significant increase of ~30% in the $H_2$ uptake and ~25% increase of $CO_2$ uptake. This overall increase in the gas uptake properties can be attributed to the modulated characteristics of the hybrid material.

VTPXRD Analysis

Figure 4:
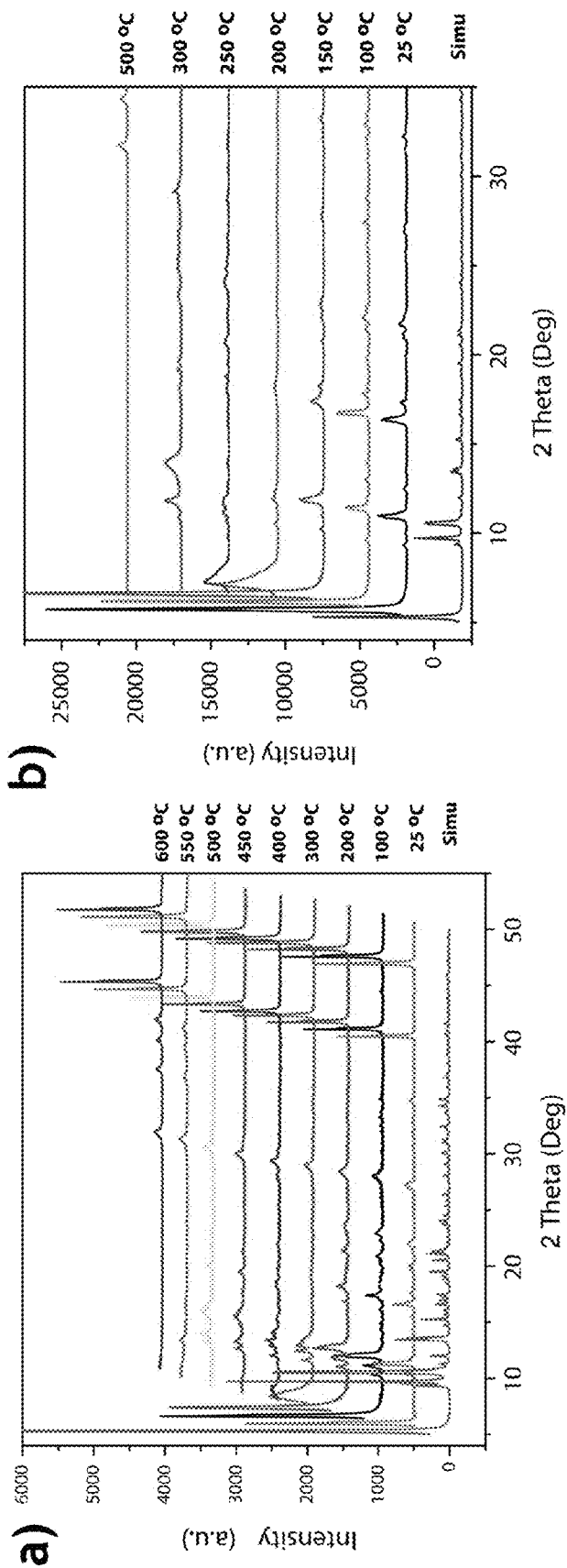
FIG. 4: VT-PXRD analysis of (a) MOF@FCNF and (b) MOF-2 showing the enhanced thermo-stability of MOF@FCNF compared to bare MOF-2.

To validate the thermal stability of the MOF@FCNF hybrid, we performed in-situ VT-PXRD of the MOF-2 and MOF@FCNF at temperatures from 25 deg C. to 600 deg C. (FIG. 4). The VT-PXRD of MOF-2 obtained clearly indicates that MOF-2 is stable and retains crystallinity up to 200° C. without any phase change. Small differences in the intensities of the reflections are observed at higher temperatures because of the removal of residual solvent molecules.

XPS Analysis

Figure 5:
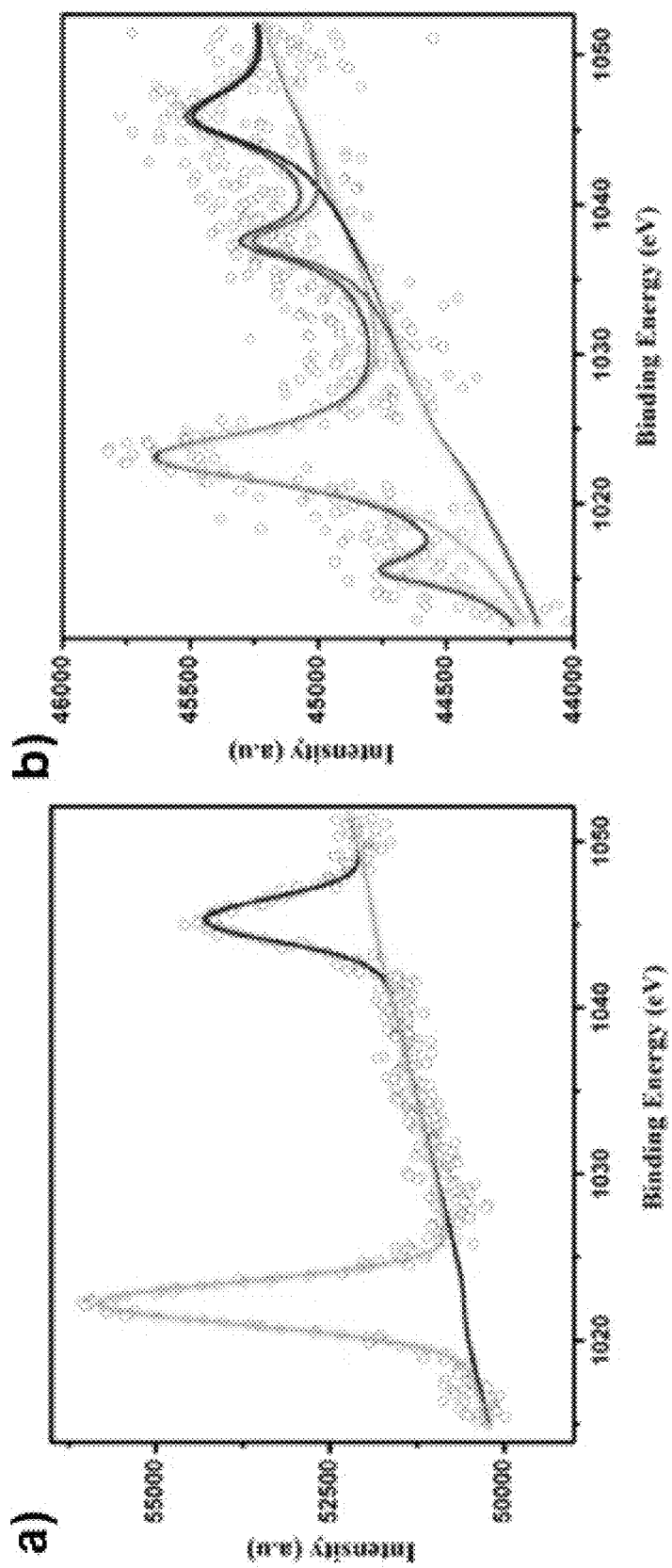
FIG. 5: (a) Deconvoluted XP spectra of Zn 2p levels in MOF@PCNF and (b) MOF@FCNF. The circles represent the experimental data, red line represents the fitting data for the overall signal and the dotted lines are the deconvoluted individual peaks for different species.

The intimate interaction between the FCNFs and the MOF is unraveled using XPS analysis as shown in FIGS. 5(a) & (b).

Example 2

Preparation of Zinc Imidazolate Framework-8 (ZIF-8)@PCNF

ZIF-8@PCNF composite was synthesized by room temperature reaction between $Zn(NO_3)_2 \cdot 6H_2O$ (0.293 gm), 2-methyl imidazole (0.648 gm) and PCNF in 40 ml dry methanol. The aforementioned amounts of the precursors, $Zn(NO_3)_2 \cdot 6H_2O$ and 2-methyl imidazole were dissolved in methanol and mixed by ultra-sonication (5 min) to get a uniform mixture to which a weighed amount (20 mg) of the PCNF was added. This was subjected to extensive sonication using a probe type sonicator (10 sec pulse for 5 times). This slurry was then kept stirring at room temperature for 24 hours for the complete formation of ZIF crystals. After 24 hrs, whole mixture was centrifuged with 10000 rpm and separated before washing it several times by dry methanol. The product was collected and dried under atmospheric conditions.

Characterization of MOF@PCNF

Scanning Electron Microscopy (SEM) studies were performed on the samples of ZIF-8@PCNF to understand the external morphology and texture of the materials. From the SEM images of the hybrid, it is clear that the loading of ZIF-8 on the outer walls of CNFs is uniform and thick as well. The change in diameter of PCNFs from 60-80 nm to 200-280 nm thickness, confirms the loading of the ZIF-8 on outer walls of CNFs.

HRTEM Analysis

HRTEM studies of the material of ZIF-8@PCNF confirmed the confinement of nano MOFs inside, outside and inside as well as outside of the PCNFs. The HRTEM image of MOF@PCNF, shown in FIGS. 6(a) and (b), clearly shows the one-dimensional loading of MOF crystals in the entire length of the inner cavity as well as outer walls of the CNFs.

PXRD Analysis

Figure 6:
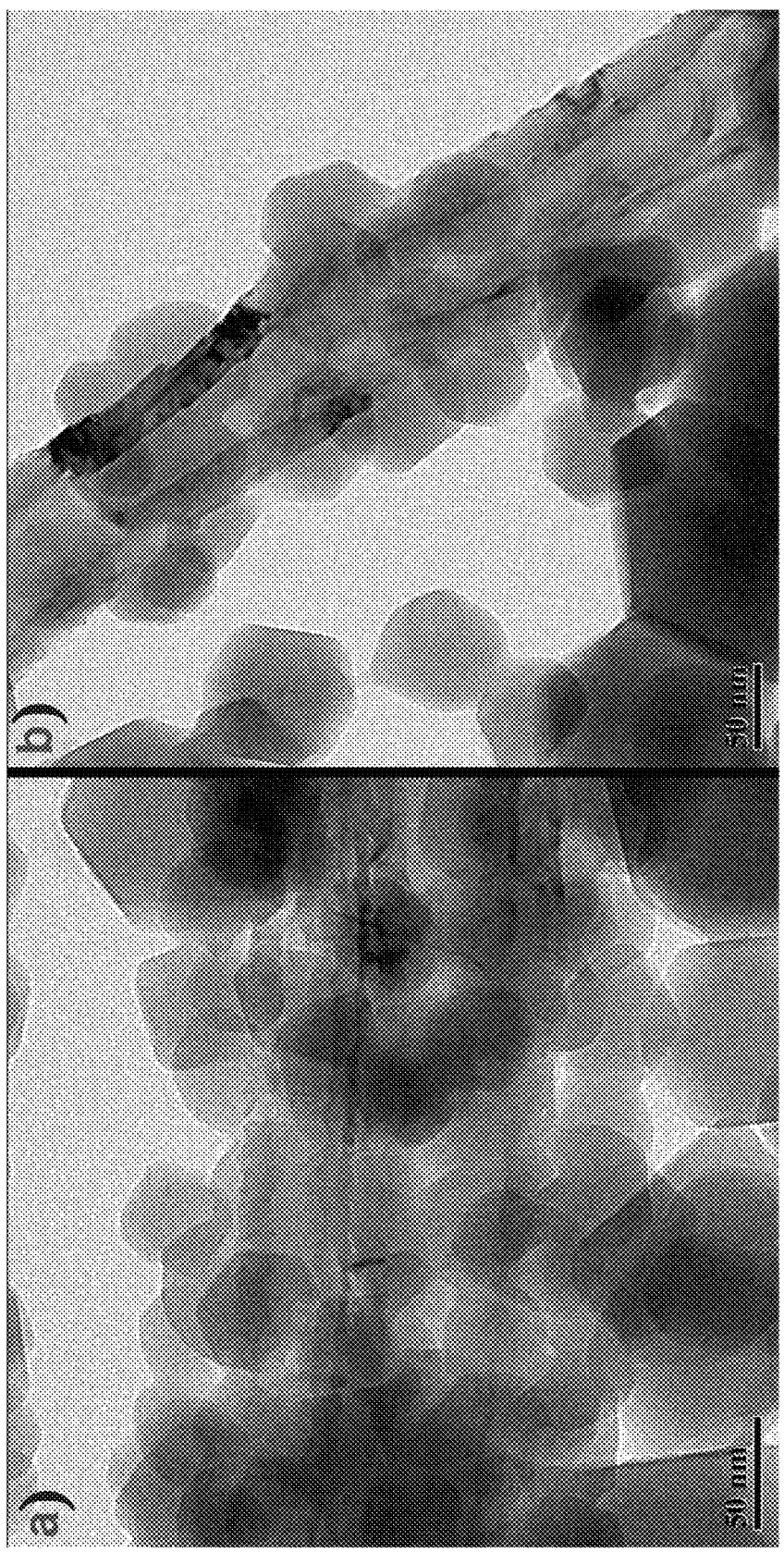
FIG. 6: (a) Low resolution TEM image of ZIF-8@PCNF and (b) High resolution TEM images of the ZIF@PCNF showing loading of the ZIF on the CNF.
Figure 7:
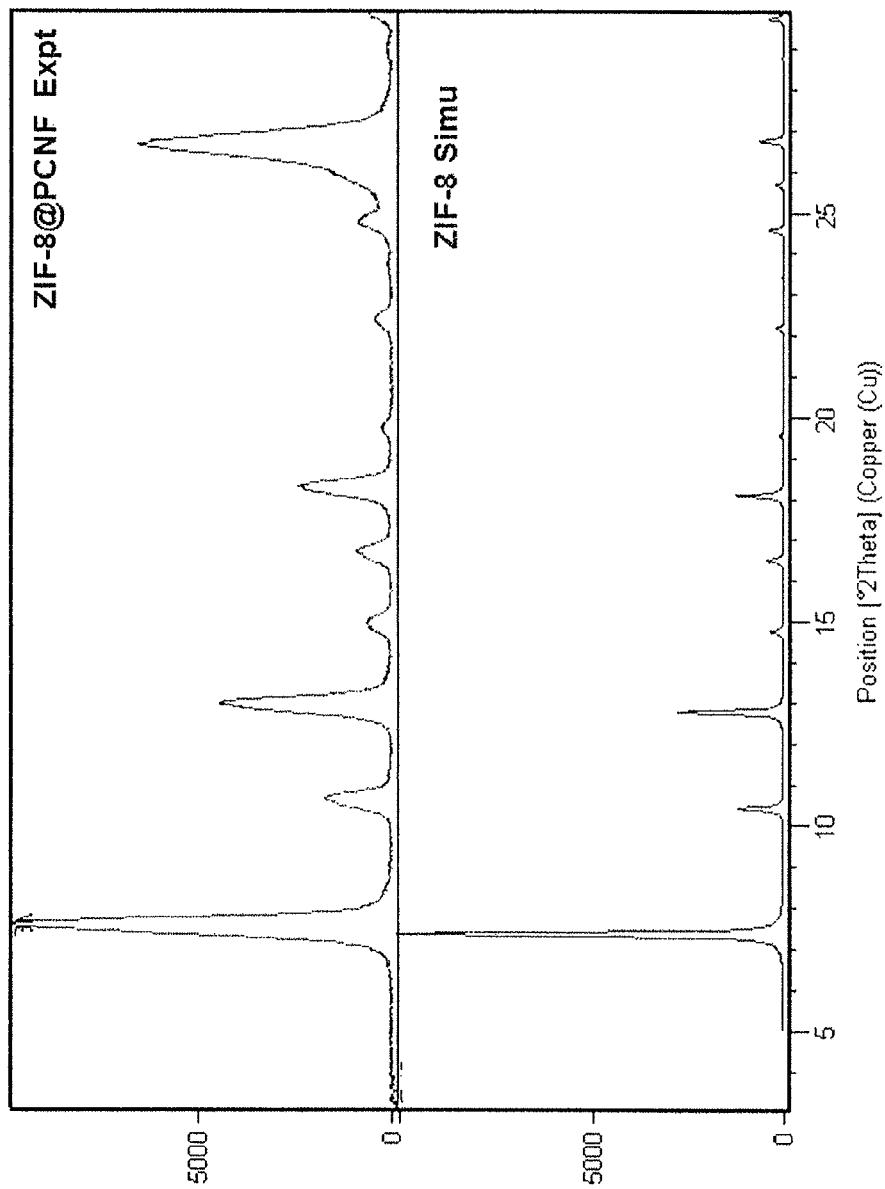
FIG. 7: PXRD analysis of the samples of ZIF-8@PCNF showing crystallinity and phase purity of the sample.

PXRD analysis of the samples of ZIF-8@PCNF performed shows the broadening of the peaks of the samples compared to the bare ZIF-8 peaks as shown in FIG. 7. All major peaks in experimental PXRD of ZIF-8@PCNF matches well with simulated PXRD pattern of ZIF-8, indicating reasonable crystallinity and phase purity (FIG. 6). In the experimental PXRD pattern of ZIF-8@PCNF, some diffraction lines are broadened compared to the simulated pattern, possibly because of interaction between PCNF and ZIF.

The other characterization parameters were found to be consistent with the details of the specification.

Advantages of the Invention

- The metal organic frameworks encapsulated in carbon morphologies are thermodynamically and chemically more stable.
- The MOF is deposited in the inner, outer cavity as well as on the both inner and outer wall of a CNF template.
- The deposition is confined to one dimension, which restricts the growth of MOFs of the invention to nanodimensions.
- The hybrid material shows improved gas uptake over FCNF and MOF-2.
- The stabilization of otherwise thermodynamically less stable variety of the MOF observed in our study may pave the way for future applications of these materials in unforeseen fields.

We claim:

1. A hybrid composite of Metal Organic Frameworks (MOF) encapsulated in nanocarbon tubes, wherein the MOFs are grown inside or outside or both side of nano carbon morphologies of the hybrid composite.

2. The hybrid composite as claimed in claim 1, wherein the deposition of MOF in nanocarbon material is one dimensional that is regular hexagonal MOF crystals as stacked in an organized manner.

3. The hybrid composite as claimed in claim 1, wherein the nanocarbon tubes are selected from the group consisting of single-walled nanocarbon tubes, double walled nanocarbon tubes or multi walled nanocarbon tubes.

4. The hybrid composite as claimed in claim 1, wherein the encapsulated MOF in nanocarbon material is of size 20-30 nm.

5. The hybrid composite as claimed in claim 1, wherein said hybrid composite is thermodynamically stable for temperature ranging between 25 to 300° C.

6. A gas uptake, gas separation of CO2 sequestration unit comprising the hybrid composite as claimed in claim 1, wherein said encapsulated MOF hybrid material is useful for gas uptake, gas separation, and $CO_2$ sequestration.

7. The hybrid composite as claimed in claim 1, wherein said composite has a gas uptake to the order of about 30% increase in the $H_2$ uptake and about 25% increase of $CO_2$ uptake as compared with equivalent metal oxide framework without the carbon nanotube.

8. A process to produce hybrid MOF encapsulated in nanocarbon material as claimed in claim 1 and the said process comprising the steps of;
   a. dissolving and mixing a salt of the metal and a ligand in the ratio ranging between 1:1 to 1:4 (by w/w ratio) by sonicating them to form a precursor mixture;
   a. adding 10 to 40% pristine (non-functionalized) or functionalized nano-carbon material to the precursor mixture of step (a);
   b. sonicating the mixture of step (b) followed by heating the mixture at temperature in the range of 80-100 deg C. for period in the range of 24-72 hours depending on the time for MOF growth to obtain MOF slurry;
   c. keeping the slurry as obtained in step (c) at a temperature in the range of 80-120° C. for period in the range of 24-48 hours followed by centrifugation at 500 to 2000 rpm to obtain MOF encapsulated in nanocarbon material.

9. The process according to claim 8, wherein the metal is selected from the group consisting of alkali metals, alkaline earth metals, transition metals, post-transition metals, lanthanides or actinides.

10. The process according to claim 8, wherein the organic ligands are selected from the group consisting of organic linkers like carboxylic acids, imidazolates, triazolates, tetrazolates, phosphates and its substituted linkers.

11. The process according to claim 8, wherein the nanomaterial is activated by an $H_2O_2$ treatment at a temperature range of 50-100 C for period in the range of 3 to 6 hours to introduce functional groups prior to reacting with precursor mixture, to introduce uniform loading.

12. The process according to claim 11, wherein the temperature for activation is about 60 C.

13. The process according to claim 8, wherein the temperature for sonication in step (c) is about 90° C.

* * * * *